United States Patent
Ma et al.

(10) Patent No.: US 11,835,726 B2
(45) Date of Patent: Dec. 5, 2023

(54) IMAGE DISPLAY METHOD, AR GLASSES AND STORAGE MEDIUM

(71) Applicant: GOERTEK INC., Shandong (CN)

(72) Inventors: Wanwan Ma, Shandong (CN); Bin Jiang, Shandong (CN); Xiaoyu Chi, Shandong (CN)

(73) Assignee: GOERTEK, INC., Shandong (CN)

( * ) Notice: Subject to any disclaimer, the term of this patent is extended or adjusted under 35 U.S.C. 154(b) by 0 days.

(21) Appl. No.: 17/996,459

(22) PCT Filed: Nov. 7, 2020

(86) PCT No.: PCT/CN2020/127358
§ 371 (c)(1),
(2) Date: Oct. 18, 2022

(87) PCT Pub. No.: WO2021/227402
PCT Pub. Date: Nov. 18, 2021

(65) Prior Publication Data
US 2023/0213773 A1    Jul. 6, 2023

(30) Foreign Application Priority Data
May 13, 2020 (CN) .......................... 202010403469.5

(51) Int. Cl.
*G02B 27/01* (2006.01)
*G06V 10/74* (2022.01)
(Continued)

(52) U.S. Cl.
CPC ..... *G02B 27/0176* (2013.01); *G02B 27/0172* (2013.01); *G02B 27/0179* (2013.01);
(Continued)

(58) Field of Classification Search
CPC .............. H04N 23/695; G02B 27/0176; G02B 27/0179; G02B 27/0172;
(Continued)

(56) References Cited

U.S. PATENT DOCUMENTS 8,942,419 B1    1/2015  Wu et al.
9,507,416 B2 *  11/2016  Kimball ................. G06F 3/012
(Continued)

FOREIGN PATENT DOCUMENTS

CN       105827960 A    8/2016
CN       106662930 A    5/2017
(Continued)

*Primary Examiner* — Vinh T Lam
(74) *Attorney, Agent, or Firm* — LKGlobal | Lorenz & Kopf, LLP (57) ABSTRACT

An image display method applied to AR glasses is disclosed. An inner frame of the AR glasses is provided with a first camera, and an outer frame of the AR glasses is provided with a second camera. The image display method comprises: detecting eye rotation information of a glasses wearer by using the first camera (S101); adjusting a shooting angle of the second camera according to the eye rotation information, and acquiring a target image collected by the second camera after adjusting the shooting angle (S102); judging whether there is a target object in the target image (S103); and if yes, displaying an image including position information of the target object via a lens of the AR glasses (S104). The object recognition accuracy of the AR glasses is improved.

16 Claims, 4 Drawing Sheets

(51) Int. Cl.
*G06V 20/10* (2022.01)
*H04N 23/695* (2023.01)
*G06F 3/01* (2006.01)

(52) U.S. Cl.
CPC .............. *G06F 3/012* (2013.01); *G06F 3/013* (2013.01); *G06V 10/761* (2022.01); *G06V 20/10* (2022.01); *H04N 23/695* (2023.01); *G02B 2027/014* (2013.01); *G02B 2027/0138* (2013.01); *G02B 2027/0141* (2013.01); *G02B 2027/0154* (2013.01); *G02B 2027/0178* (2013.01); *G02B 2027/0187* (2013.01)

(58) Field of Classification Search
CPC .... G02B 2027/0187; G02B 2027/0138; G02B 2027/0154; G02B 2027/0178; G02B 2027/014; G02B 2027/0141; G06F 3/013; G06F 3/012; G06V 10/761; G06V 20/10
See application file for complete search history.

(56) References Cited

U.S. PATENT DOCUMENTS

| | | | | |
|---|---|---|---|---|
| 9,766,703 B2 * | 9/2017 | Miller | .................. | G06T 7/60 |
| 9,842,433 B2 * | 12/2017 | Luo | .................. | H04N 13/239 |
| 9,984,506 B2 * | 5/2018 | Miller | .................. | G06F 3/167 |
| 10,477,157 B1 * | 11/2019 | Shahdi | .................. | H04N 13/271 |
| 10,567,641 B1 * | 2/2020 | Rueckner | .................. | H04N 23/62 |
| 10,571,689 B2 * | 2/2020 | Shimura | .................. | G06F 3/011 |
| 10,586,394 B2 * | 3/2020 | Perez-Ramirez | .................. | G06V 20/20 |
| 10,825,251 B2 * | 11/2020 | Peltola | .................. | G16H 40/63 |
| 10,838,205 B2 * | 11/2020 | Fujimaki | .................. | G01C 21/3652 |
| 10,860,100 B2 * | 12/2020 | Osterhout | .................. | G06F 3/012 |
| 10,877,262 B1 * | 12/2020 | Luxembourg | .................. | G02B 27/0172 |
| 10,890,751 B2 * | 1/2021 | Huang | .................. | G09B 5/02 |
| 10,915,180 B2 * | 2/2021 | Marggraff | .................. | G06F 3/0485 |
| 10,930,275 B2 * | 2/2021 | Cartwright | .................. | G06F 3/017 |
| 11,151,793 B2 * | 10/2021 | Busto | .................. | G06T 19/006 |
| 11,320,957 B2 * | 5/2022 | Tang | .................. | G06F 3/017 |
| 11,334,155 B2 * | 5/2022 | Qin | .................. | G02B 27/0172 |
| 11,666,825 B2 * | 6/2023 | Delamont | .................. | G06T 13/20 |
| | | | | 463/32 |
| 11,698,529 B2 * | 7/2023 | Lai | .................. | G02B 27/0093 |
| | | | | 706/11 |
| 2009/0284608 A1 | 11/2009 | Hong et al. | | |
| 2015/0346816 A1 | 12/2015 | Lee | | |
| 2017/0227754 A1 * | 8/2017 | Huang | .................. | G09B 5/02 |
| 2019/0227694 A1 * | 7/2019 | Shin | .................. | G06F 3/017 |
| 2019/0272029 A1 * | 9/2019 | Fein | .................. | G06T 11/60 |
| 2020/0133010 A1 * | 4/2020 | Eromaki | .................. | G02B 27/0101 |
| 2021/0072536 A1 * | 3/2021 | Lee | .................. | G02B 27/0176 |
| 2021/0102820 A1 * | 4/2021 | Le | .................. | G06F 1/1694 |

FOREIGN PATENT DOCUMENTS

| | | | | |
|---|---|---|---|---|
| CN | 107092346 A | 8/2017 | | |
| CN | 207397225 A | 5/2018 | | |
| CN | 108829250 A | 11/2018 | | |
| CN | 109086726 A | 12/2018 | | |
| CN | 109254659 A | 1/2019 | | |
| CN | 109683701 A | 4/2019 | | |
| CN | 209148966 A | 7/2019 | | |
| CN | 110647822 A | 1/2020 | | |
| CN | 111552076 A | 8/2020 | | |
| WO | WO-2019147021 A1 * | 8/2019 | ............ | G06F 1/163 |
| WO | 2019233210 A1 | 12/2019 | | |

* cited by examiner

IMAGE DISPLAY METHOD, AR GLASSES AND STORAGE MEDIUM

CROSS REFERENCE TO RELATED APPLICATIONS

This application is a U.S. National Stage entry under 35 U.S.C. § 371 based on International Application No. PCT/CN2020/127358, filed on Nov. 7, 2020. This application claims priority to Chinese patent application No. 202010403469.5 filed with the China Patent Office on May 13, 2020 and entitled "Image Display Method, AR glasses and Storage Medium". These applications are hereby incorporated herein in their entirety by reference.

TECHNICAL FIELD

This application pertains to the technical field of intelligent wearable devices, more particularly, to an image display method, AR glasses and a storage medium.

BACKGROUND

AR (augmented reality) technology is for an ingenious fusion of virtual information with the real world. It can simulate computer-generated virtual information such as text, image, 3D model, music and video and apply them to the real world, and realize the "augmentation" of the real world.

AR glasses using AR technology have been widely used in games, entertainment, medical treatment, shopping and education. However, AR glasses in related technologies focus on the display of preset virtual scenes, such as a roller coaster and a racing track. They typically only recognize the objects in the central region of the shooting range of AR glasses, and often ignore the objects in the edge region of the shooting range of AR glasses, so they have low object recognition accuracy.

Therefore, how to improve the object recognition accuracy of AR glasses is a technical problem that needs to be solved by those skilled in the art. In addition, other objects, desirable features and characteristics will become apparent from the subsequent summary and detailed description, and the appended claims, taken in conjunction with the accompanying drawings and this background.

SUMMARY

The object of the present disclosure is to provide an image display method, AR glasses and a storage medium, which can improve the object recognition accuracy of AR glasses.

In order to solve the above technical problem, the present disclosure provides an image display method applied to AR glasses, an inner frame of the AR glasses is provided with a first camera, an outer frame of the AR glasses is provided with a second camera, and the image display method comprises:

detecting eye rotation information of a glasses wearer by using the first camera;
  adjusting a shooting angle of the second camera according to the eye rotation information, and acquiring a target image collected by the second camera after adjusting the shooting angle;
  judging whether there is a target object in the target image; and
  if yes, displaying an image including position information of the target object via a lens of the AR glasses.

Optionally, if there is no target object in the target image, the method further comprises:

setting a region corresponding to the target image as a first type of region, and updating a region map, wherein the region map includes the first type of region and a second type of region, the first type of region is a region not containing the target object, and the second type of region is a region containing the target object; and
  displaying an updated region map via the lens of the AR glasses.

Optionally, after updating the region map, the method further comprises:

calculating a job completion rate according to an area proportion of the first type of region and the second type of region in the updated region map, and displaying the job completion rate via the lens of the AR glasses.

Optionally, the method further comprises:

receiving a safety monitoring message transmitted by a safety device and displaying the safety monitoring message via the lens of the AR glasses, wherein the safety device comprises any one or a combination of some of following devices: a safety belt detection device, a blood pressure monitoring device and a heart rate detection device.

Optionally, after acquiring the target image collected by the second camera after adjusting the shooting angle, the method further comprises:

performing an image recognition operation on the target image, and determining a regional terrain of a region corresponding to the target image according to an image recognition result; and
  if the regional terrain is dangerous, generating a corresponding prompt message.

Optionally, acquiring the target image collected by the second camera after adjusting the shooting angle comprises:

acquiring a plurality of the target images collected by the second camera after adjusting the shooting angle;
  correspondingly, the method further comprises:
  determining a common shooting region of all the target images;
  performing a similarity comparison operation on the common shooting region in adjacent target images according to a shooting sequence; and
  judging whether there is a high-altitude falling object in the common shooting region according to a similarity comparison result; and
  if yes, generating a corresponding alarm message.

Optionally, the AR glasses further comprise an acceleration sensor for detecting a head tilt angle;

correspondingly, the image display method further comprises:
  calculating a visible region of the glasses wearer according to the head tilt angle and the eye rotation information;
  setting a region in the visible region where a viewing angle is less than a preset value as a region to be blocked;
  determining a target lens region in the lens of the AR glasses through which a line of sight of the glasses wearer passes when the glasses wearer observes the region to be blocked; and
  displaying a preset picture with a preset transparency in the target lens region.

The present disclosure also provides AR glasses, comprising:

a first camera provided on an inner frame of the AR glasses and configured to take an eye picture of a glasses wearer;

a second camera provided on an outer frame of the AR glasses and configured to collect a target image; and a processor connected with the first camera and the second camera respectively and configured to: determine eye rotation information of the glasses wearer according to the eye picture; adjust a shooting angle of the second camera according to the eye rotation information, and acquire a target image collected by the second camera after adjusting the shooting angle; judge whether there is a target object in the target image; and if yes, display an image including position information of the target object via a lens of the AR glasses.

Optionally, the AR glasses further comprise:

a communication device connected with the processor and a safety device respectively and configured to send a safety monitoring message transmitted by the safety device to the processor, wherein the safety device comprises any one or a combination of some of the following devices: a safety belt detection device, a blood pressure monitoring device and a heart rate detection device;

correspondingly, the processor is further configured to display the safety monitoring message via the lens of the AR glasses.

The present disclosure also provides a storage medium having a computer program stored thereon, wherein when the computer program is executed, steps of the image display method as described above are realized.

The present disclosure provides an image display method applied to AR glasses, an inner frame of the AR glasses is provided with a first camera, an outer frame of the AR glasses is provided with a second camera, and the image display method comprises: detecting eye rotation information of a glasses wearer by using the first camera; adjusting a shooting angle of the second camera according to the eye rotation information, and acquiring a target image collected by the second camera after adjusting the shooting angle; determining whether there is a target object in the target image; and if yes, displaying an image including position information of the target object via a lens of the AR glasses.

The AR glasses to which the present disclosure is applied comprise a first camera for detecting eye rotation information of a glasses wearer and a second camera for collecting a target image. In the present disclosure, a shooting angle of the second camera is adjusted according to the eye rotation information, and then a corresponding target image is collected under the shooting angle. If the target image includes a target object, the position information of the target object is displayed via a lens of the AR glasses. In the present disclosure the shooting angle of the second camera can be dynamically adjusted according to the eye rotation information of the glasses wearer, and the target image same as the observation region of the glasses wearer is obtained by camera shooting, so as to determine whether there is a target object in the region currently observed by the user. The solutions according to the present disclosure can dynamically adjust the shooting angle for detecting the target object according to the rotation of the user's viewing angle, thereby improving the object recognition accuracy of AR glasses. The present disclosure also provides AR glasses and a storage medium, which have the above beneficial effects and will not be repeated here.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

Figure 1:
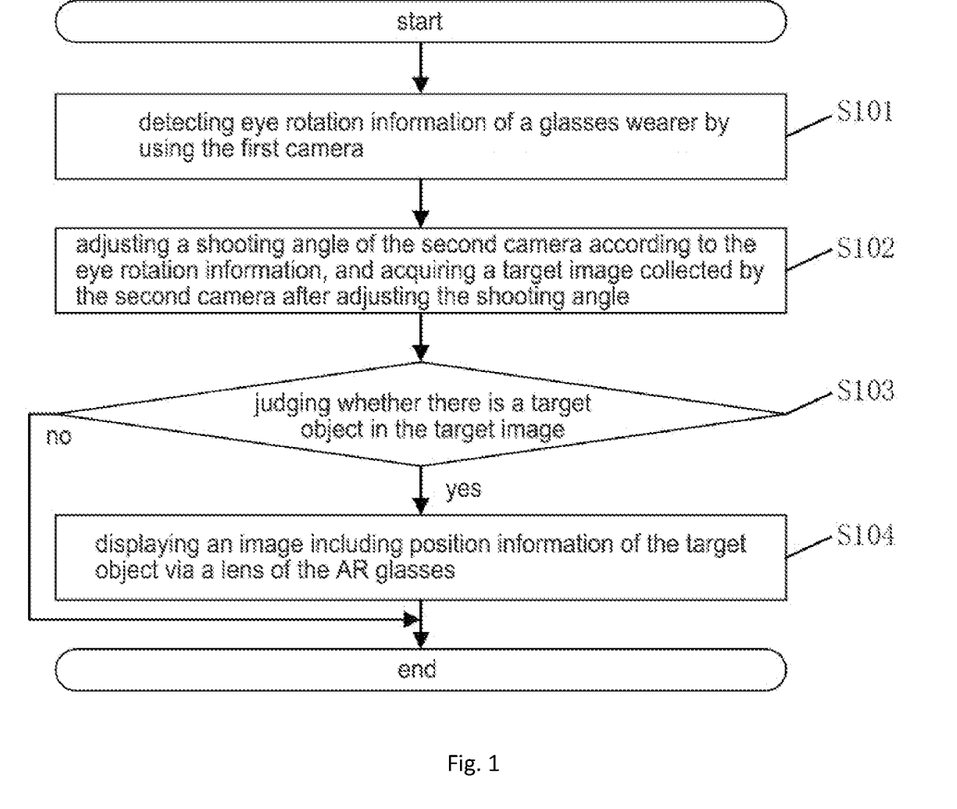
FIG. 1 is a flowchart of an image display method according to an embodiment of the present disclosure.

Please refer to FIG. 1, which is a flowchart of an image display method according to an embodiment of the present disclosure.

The specific steps may comprise:

S101: detecting eye rotation information of a glasses wearer by using a first camera;

This embodiment can be applied to AR glasses. The AR glasses may comprise a frame and lens. The AR glasses may also be assembled with corresponding head wearing equipment to obtain an AR helmet. Specifically, the frame of the AR glasses to which this embodiment is applied may comprise an inner frame facing the wearer's eyes, and may further comprise an outer frame facing outside. In this embodiment, the inner frame of the AR glasses is provided with a first camera, and the outer frame of the AR glasses is provided with a second camera. The position and number of the first camera and the second camera in the inner frame and the outer frame of the glasses are not limited herein.

In this embodiment, firstly, the eye rotation information of the glasses wearer is detected using the first camera. The eye rotation information may include the movement changes of the eye, such as horizontally rotating leftward by 30 degrees, vertically rotating downward by 15 degrees, etc. As a feasible implementation, in this embodiment, the operation of acquiring the eye rotation information may comprise: determining a position of the pupil in the eye at the current moment, determining the position of the pupil in the eye at the next moment after a preset period of time, and determining the eye rotation information according to the position change of the pupil in the eye at the current moment and the next moment. As another feasible implementation, the inner frame usually comprises two parts: the left inner frame and the right inner frame. In this embodiment, the first camera may be provided in the left inner frame and the right inner frame respectively. The first camera provided on the left inner frame is configured to detect the left eye rotation information of the glasses wearer; the first camera provided on the right inner frame is configured to detect the right eye rotation information of the glasses wearer. Finally, the left eye rotation information and the right eye rotation information are averaged to obtain the eye rotation information determined in this step. Further, in the above solution in which the first camera is provided on both the left inner frame and the right inner frame, the position of the first camera on the left inner frame and the position of the second camera on the right inner frame are symmetrical about a central axis of the glasses. The central axis is a line that divides the AR glasses into the left half and right half of glasses.

S102: adjusting a shooting angle of the second camera according to the eye rotation information, and acquiring a target image collected by the second camera after adjusting the shooting angle;

The second camera is disposed on the outer frame of the glasses, and can take pictures for target object detection. In this embodiment, after determining the eye rotation information, the shooting angle of the second camera is adjusted according to the eye rotation information, so that the target image can be captured by the second camera after the shooting angle is adjusted. Specifically, in this embodiment, the process of adjusting the shooting angle of the second camera may comprise: determining information to be adjusted according to the eye rotation information, and adjusting the shooting angle of the second camera according to the information to be adjusted. In this embodiment, a corresponding relationship between the eye rotation information and the information to be adjusted may be set in advance. After the eye rotation information is determined, the information to be adjusted can be determined according to the corresponding relationship between the eye rotation information and the information to be adjusted. The information to be adjusted includes the target direction and the target angle, and the second camera is controlled to move the target angle to the target direction.

For example, the corresponding relationship between the eyeball rotation information and the information to be adjusted is that, the rotation direction of the eyeball rotation information is consistent with the rotation direction of the information to be adjusted, and the rotation angle of the eyeball rotation information multiplied by a correlation coefficient (e.g. 0.98) is equal to the information to be adjusted. If the eyeball rotation information detected in S101 is horizontally rotating to the right by 20 degrees, then according to the corresponding relationship between the eye rotation information and the information to be adjusted, the target direction in the information to be adjusted is horizontally rotating to the right, and the target angle in the information to be adjusted is 20*0.98=19.6 degrees. At this point, the second camera will be controlled to horizontally rotate to the right by 19.6 degrees, so as to acquire the target image collected by the second camera after horizontally rotating to the right by 19.6 degrees.

It can be understood that, in this embodiment, the second camera may always collect images according to a preset frequency. In this embodiment, the image collected by the second camera after adjusting the shooting angle is set as the target image.

S103: judging whether there is a target object in the target image; if yes, proceed to S104; if no, end the process;

After obtaining the target image, in this embodiment, an image recognition operation may be performed on the target image to determine whether there is a target object in the target image. In this embodiment, the type of the target object is not limited. When this embodiment is applied to the working scene of sanitation workers, the target objects may include bottles, newspapers, fallen leaves, etc.

As a feasible implementation, the process of determining whether there is a target object in the target image in this embodiment may comprise: performing an image recognition operation on the target image to obtain an image recognition result which includes a position of the target object in the target image and quantity information of the target object; if the quantity of target object is 0, it indicates that there is no target object in the target image; if the quantity of target object is not 0, it indicates that there is a target object in the target image, and proceed to S104.

S104: displaying an image including position information of the target object via a lens of the AR glasses.

This step is based on the judgment that the target image includes a target object. The position information of the target object is calculated according to the position of the target object in the target image to generate an image including the position information, and the image including the position information of the target object is displayed via a lens of the AR glasses, so as to show the orientation of the target object to the glasses wearer. As a feasible implementation, in this embodiment, an image including the position information of all target objects may be displayed via a lens of the AR glasses.

The AR glasses to which this embodiment is applied comprise a first camera for detecting eye rotation information and a second camera for collecting a target image. This embodiment adjusts the shooting angle of the second camera according to the eye rotation information of the glasses wearer, and then collects a corresponding target image under the shooting angle. If the target image includes a target object, the position information of the target object is displayed via leans of the AR glasses. This embodiment can dynamically adjust the shooting angle of the second camera according to the eye rotation information of the glasses wearer, and obtain the target image same as the observation region of the glasses wearer by camera shooting, so as to determine whether there is a target object in the region currently observed by the user. The solutions according to this embodiment can dynamically adjust the shooting angle for detecting target object according to the rotation of the user's viewing angle, thereby improving the object recognition accuracy of AR glasses.

As a further introduction on the embodiment corresponding to FIG. 1, if it is judged in S103 that there is no target object in the target image, this embodiment may set a region corresponding to the target image as a first type of region and update a region map; and display the updated region map via a lens of the AR glasses. The region map includes a first type of region and a second type of region, the first type of region is a region not containing the target object, and the second type of region is a region containing the target object.

When this embodiment is applied to the scene of glass cleaning high above the ground, the target object to be recognized is a glass with dust. When a worker wears the AR glasses according to the embodiments of the present disclosure to perform glass cleaning high above the ground, the AR glasses can automatically recognize the glass with dust (i.e., the glass to be cleaned), and automatically set the glass region after cleaned as the first type of region after the worker cleaned the glass, set the glass region that has not been cleaned as the second type of region, and the worker can determine the region to be cleaned according to the region map. The working area of workers high above the ground is large, so it is difficult for human eyes to scan the working region. The AR glasses of this embodiment can display the region map and mark the completed region and the uncompleted region. Of course, when the wearer completes the scanning of all regions and there is no target object, the communication system of the AR glasses will send a completion signal to avoid region omission. This embodiment can record the work attendance according to the completion signal sent by the communication system of AR glasses, and evaluate the job completion rate of operators in sequence.

Of course, this embodiment may also send the required data to a relevant server. The sent data may include the glasses wearer information, the scanned region, the number of objects in the region, etc. These data may be analyzed. When there are too many target objects, the regions of special importance may be highlighted. For example, if it is detected that there is too much garbage in a certain place for a certain period of time, this region may be specially analyzed and treated.

As a further introduction on the embodiment corresponding to FIG. 1, after updating the region map according to the first type of region and the second type of region, the job completion rate may also be calculated according to the area rate of the first type of region and the second type of region in the updated region map, and the job completion rate may be displayed via a lens of the AR glasses.

As a further introduction on the embodiment corresponding to FIG. 1, the AR glasses mentioned in this embodiment may also be wired or wireless connected with a variety of safety devices, so that the AR glasses can receive a safety monitoring message transmitted by the safety device and display the safety monitoring message via a lens of the AR glasses. The safety device comprises any one or a combination of some of the following devices: a safety belt detection device, a blood pressure monitoring device and a heart rate detection device. The safety belt detection device is a device configured to detect whether the safety belt buckle is in place.

As a further introduction on the embodiment corresponding to FIG. 1, after the step S102 of acquiring the target image collected the second camera after adjusting the shooting angle, the method may further comprise: performing an image recognition operation on the target image, and determining a regional terrain of a region corresponding to the target image according to an image recognition result; and if the regional terrain is dangerous, generating a corresponding prompt message. As a feasible implementation, the second camera mentioned in this embodiment is a depth camera, which can perform regional terrain recognition in combination with the depth information in the target image.

As a further introduction on the embodiment corresponding to FIG. 1, the step S102 may be: acquiring a plurality of the target images collected by the second camera after adjusting the shooting angle; determining a common shooting region of all the target images; performing a similarity comparison operation on the common shooting region in adjacent target images according to a shooting sequence; judging whether there is a high-altitude falling object in the common shooting region according to a similarity comparison result; and if yes, generating a corresponding alarm message.

The common shooting region of all target images is the overlapped region in the shooting regions corresponding to all target images. Since there is a certain shooting time interval between the target images, this embodiment may determine whether there is an object moving downward within the shooting time interval by comparing the similarity of the images corresponding to the common shooting region in the target images in sequence according to the shooting sequence.

Specifically, in this embodiment, the similarity comparison may be performed on the common shooting region in adjacent target images in sequence according to the shooting sequence, and it is determined whether there are objects with position changes in adjacent target images according to the similarity comparison result. If there is a same object moving downward in N number of consecutive target images, it is determined that there is a high-altitude falling object in the common shooting region, and a corresponding alarm message can be generated at this moment. By detecting high-altitude falling objects, this embodiment can avoid the danger caused by the blind spot invisible to the operator and improve the safety.

As a further introduction on the embodiment corresponding to FIG. 1, it may be selected whether to activate a blocking mode according to the wearer's head action. After the blocking mode is activated, when the wearer looks down, some pictures will appear on the lens to block the objects below. In this way, people who are afraid of heights can also engage in high-altitude work, thereby expanding the scope of employment. Further, the AR glasses mentioned in the embodiment corresponding to FIG. 1 may comprise an acceleration sensor for detecting the head tilt angle. The AR glasses may calculate a visible region of the glasses wearer according to the head tilt angle and the eye rotation information; set a region in the visible region where a viewing angle is less than a preset value as a region to be blocked; determine a target lens region in the lens of the AR glasses through which a line of sight of the glasses wearer passes when the glasses wearer observes the region to be blocked; and display a preset picture with a preset transparency in the target lens region.

The AR glasses mentioned in the above embodiment can be applied to the process of work high above the ground. The visible region is the region that the glasses wearer can see under the current viewing angle. In order to avoid fear of heights for the glasses wearer at high altitude, this embodiment sets a region in the visible region where a viewing angle is less than a preset value as a region to be blocked. The above viewing angle refers to the included angle between a line connecting the user's pupil and a certain point on the boundary of the visible region and the horizontal line. This embodiment further determines a target lens region in the lens of the AR glasses through which a line of sight of the glasses wearer passes when the glasses wearer observes the region to be blocked, and display a preset picture with a preset transparency in the target lens region, which can prevent the glasses wearer from seeing the environment below and overcome the fear of heights.

Figure 2:
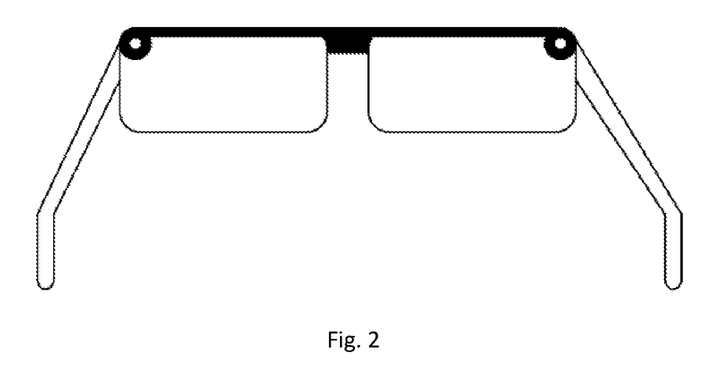
FIG. 2 is a schematic view of the appearance of AR glasses according to an embodiment of the present disclosure.

Please refer to FIG. 2 which is a schematic view of the appearance of AR glasses according to an embodiment of the present disclosure. The AR glasses may comprise:

a first camera provided on an inner frame of the AR glasses and configured to take an eye picture of a glasses wearer;

a second camera provided on an outer frame of the AR glasses and configured to collect a target image; and a processor connected with the first camera and the second camera respectively and configured to: determine eye rotation information of the glasses wearer according to the eye picture; adjust a shooting angle of the second camera according to the eye rotation information, and acquire a target image collected by the second camera after adjusting the shooting angle; judge whether there is a target object in the target image; and if yes, display an image including position information of the target object via a lens of the AR glasses.

The AR glasses to which this embodiment is applied comprise a first camera for detecting eye rotation information and a second camera for collecting a target image. This embodiment adjusts the shooting angle of the second camera according to the eye rotation information of the glasses wearer, and then collects a corresponding target image under the shooting angle. If the target image includes a target object, the position information of the target object is displayed via a lens of the AR glasses. This embodiment can dynamically adjust the shooting angle of the second camera according to the eye rotation information of the glasses wearer, and obtain the target image same as the observation region of the glasses wearer by camera shooting, so as to determine whether there is a target object in the region currently observed by the user. The solution according to this embodiment can dynamically adjust the shooting angle for detecting a target object according to the rotation of the user's viewing angle, thereby improving the object recognition accuracy of AR glasses.

Further, the AR glasses further comprise:
a communication device connected with the processor and a safety device respectively and configured to send a safety monitoring message transmitted by the safety device to the processor, wherein the safety device comprises any one or a combination of some of the following devices: a safety belt detection device, a blood pressure monitoring device and a heart rate detection device;
correspondingly, the processor is further configured to display the safety monitoring message via the lens of the AR glasses.

The AR glasses further comprise:
a map updating module configured to, if there is no target object in the target image, set a region corresponding to the target image as a first type of region, and update a region map, wherein the region map includes the first type of region and a second type of region, the first type of region is a region not containing the target object, and the second type of region is a region containing the target object; and display an updated region map via a lens of the AR glasses;
a job progress calculation module configured to calculate a job completion rate according to an area rate of the first type of region and the second type of region in the updated region map, and display the job completion rate via a lens of the AR glasses.

Further, it also comprises: a terrain recognition module configured to perform an image recognition operation on the target image, and determine a regional terrain of a region corresponding to the target image according to an image recognition result; and if the regional terrain is dangerous, generate a corresponding prompt message.

Further, the processor is also configured to acquire a plurality of the target images collected by the second camera after adjusting the shooting angle; determine a common shooting region of all the target images; perform a similarity comparison operation on the common shooting region in adjacent target images according to a shooting sequence; judge whether there is a high-altitude falling object in the common shooting region according to a similarity comparison result; and if yes, generate a corresponding alarm message.

Further, the AR glasses comprise an acceleration sensor for detecting a head tilt angle;
correspondingly, the processor is further configured to: calculate a visible region of the glasses wearer according to the head tilt angle and the eye rotation information; set a region in the visible region where a viewing angle is less than a preset value as a region to be blocked; determine a target lens region in the lens of the AR glasses through which a line of sight of the glasses wearer passes when the glasses wearer observes the region to be blocked; and display a preset picture with a preset transparency in the target lens region.

Figure 3:
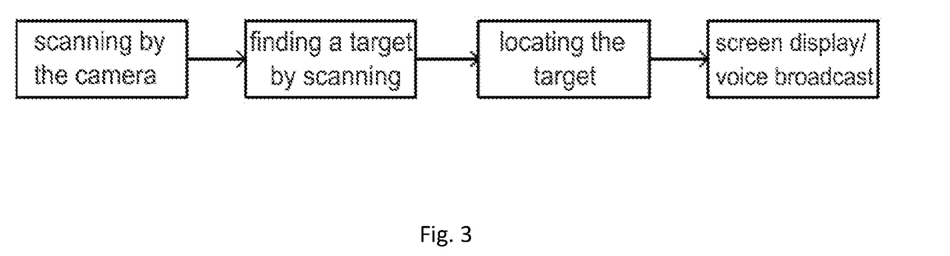
FIG. 3 is a schematic view of the target object recognition principle of AR glasses for work high above the ground according to an embodiment of the present disclosure.
Figure 4:
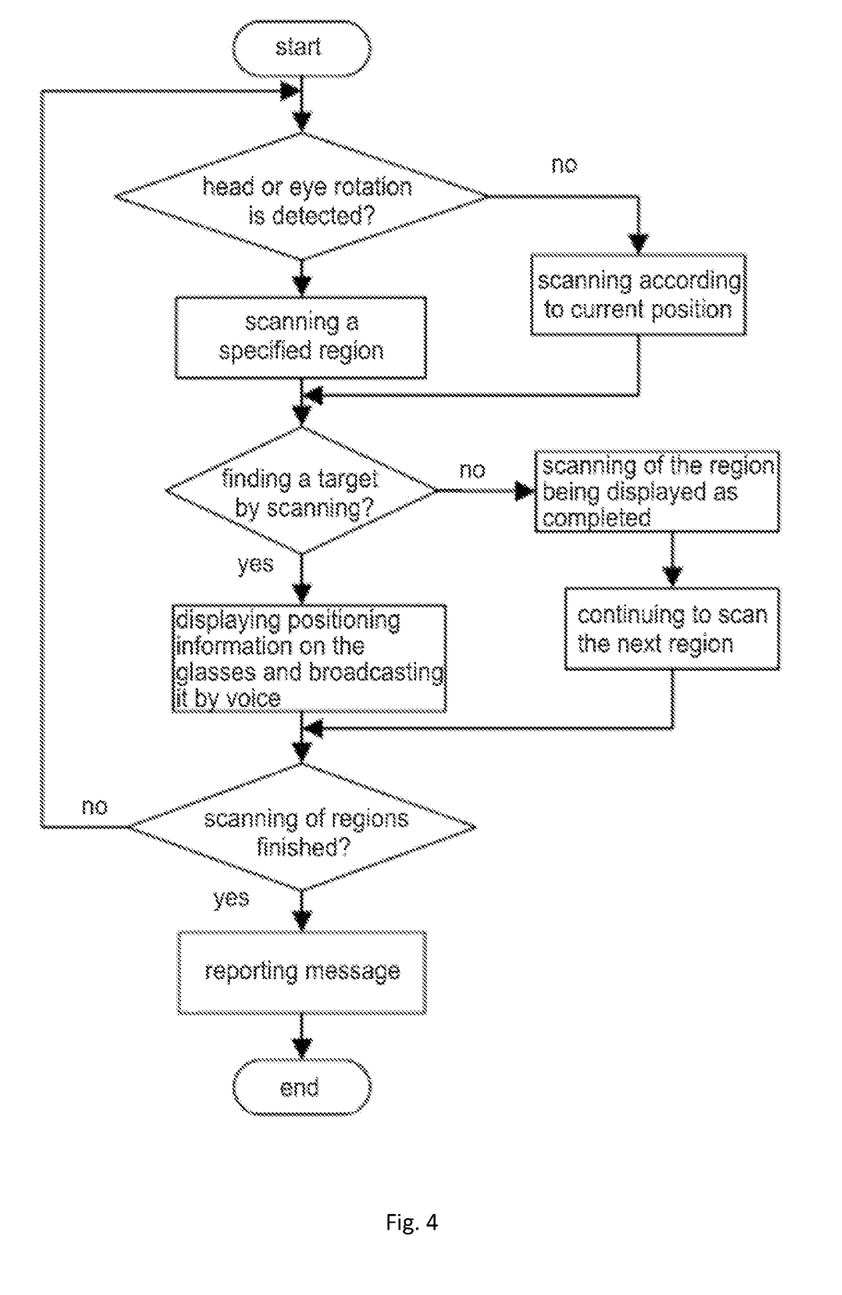
FIG. 4 is a flowchart of the scanning process of AR glasses for work high above the ground according to an embodiment of the present disclosure.

Please refer to FIG. 3 and FIG. 4, FIG. 3 is a schematic view of the target object recognition principle of AR glasses for work high above the ground according to an embodiment of the present disclosure; and FIG. 4 is a flowchart of the scanning process of the AR glasses for work high above the ground according to an embodiment of the present disclosure. The target in FIG. 3 and FIG. 4 is the target object.

In this embodiment, two outer cameras are provided on the outer side of the AR glasses. When the wearer's head turns to a direction, the outer cameras focus on scanning the turned region. The outer cameras are adjusted to scan in a corresponding direction according to the eye action captured by the inner camera. When the outer cameras have scanned a target object (such as plastic waste), the two outer cameras may accurately locate the target object, and the location information of the target object will be displayed on the lens in the form of text or pictures, and played out by a voice broadcast module in the AR glasses.

In this embodiment, the region map that needs to be scanned may be displayed on the AR glasses, and a frequently used region map software package may be downloaded to the AR glasses. One lens may be selected to display a region that is currently scanned, a region that has been scanned and a region that has not been scanned. When all work regions have been scanned, the AR glasses may upload the number of target objects in the region, information of regional workers and other data to a server. The data uploaded to the server may be used to analyze the target objects, and may also be used as the staff attendance standard.

The inner side of the frame of the AR glasses is provided with an inner camera, which can capture the eye movements of the wearer. For example, the outer camera may be controlled to scan a corresponding region according to the wearer's eye rotation direction. Of course, the actual number of target objects obtained may also be recorded according to the blinks of the wearer.

An acceleration sensor may also be built in the AR glasses. When the wearer keeps his head vertical, he can observe the place that can be seen by his eyes. When the wearer bows his head downward beyond a certain angle, some pictures will appear on the lens of the wearer's AR glasses to block the view below, so as to prevent dizziness and other acrophobia symptoms. The blocking mode may be selected according to requirements. It may be turned off when the user does not need it, and turned on when the user needs it.

The AR glasses according to this embodiment can independently find and set a target object according to the wearer's purpose, and display it on the lens in the form of image, voice, text, etc., which improves the work efficiency of workers high above the ground (such as high-altitude glass cleaning, cliff garbage collection). This embodiment can also switch between the transparent mode and the blocking mode according to the needs of the wearer, so that the personnel with special symptoms can also adapt to such a high-risk work. In addition, the AR glasses can also report data to the server, which is conducive to data analysis.

Since the embodiments of the device part correspond to the embodiments of the method part, regarding the embodiments of the device part, please refer to the description of the embodiments of the method part, which will not be repeated here.

The present disclosure also provides a storage medium having a computer program stored thereon. When the computer program is executed, the steps of the above embodiments can be realized. The storage medium may include USB flash disk, mobile hard disk, read only memory (ROM), random access memory (RAM), magnetic disc or optical disc and other media that can store program codes.

The embodiments in this specification are described in a parallel or progressive manner. Each embodiment focuses on the differences from other embodiments. The same or similar parts of each embodiment may be referred by each other. As for the devices disclosed in the embodiments, since they correspond to the methods disclosed in the embodiments, their description is relatively simple, and relevant parts may refer to the description of the method part.

Those skilled in the art will also understand that the units and algorithm steps of the examples described in conjunction with the embodiments disclosed herein can be implemented in electronic hardware, computer software or a combination thereof. In order to clearly illustrate the interchangeability of hardware and software, the composition and steps of the examples have been generally described in the above description according to functions. Whether these functions are implemented in hardware or software depends on the specific application and design constraints of the technical solution. Those skilled in the art may use different methods to realize the described functions for each specific application, but such implementation shall not be considered beyond the scope of the present disclosure.

The steps of a method or algorithm described in conjunction with the embodiments disclosed herein may be implemented directly with hardware, a software module executed by a processor, or a combination thereof. The software module may be disposed in a random access memory (RAM), a memory, a read only memory (ROM), an electrically programmable ROM, an electrically erasable programmable ROM, a register, a hard disk, a removable disk, a CD-ROM, or any other form of storage medium known in the art.

It should also be noted that, relational terms such as first and second used herein are only to distinguish one entity or operation from another, and do not necessarily require or imply that there is such actual relationship or order among those entities or operations. Moreover, the terms "comprise", "include" or any other variants are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the phrase "comprising a . . . " does not exclude the case that there are other same elements in the process, method, article or apparatus including the element.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An image display method, characterized in being applied to AR glasses, an inner frame of which is provided with a first camera, and an outer frame of which is provided with a second camera, the image display method comprises:
   detecting eye rotation information of a glasses wearer by using the first camera;
   adjusting a shooting angle of the second camera according to the eye rotation information, and acquiring a target image collected by the second camera after adjusting the shooting angle;
   judging whether there is a target object in the target image; and
   if yes, displaying an image including position information of the target object via a lens of the AR glasses.

2. The image display method according to claim 1, wherein if there is no target object in the target image, the method further comprises:
   setting a region corresponding to the target image as a first type of region, and updating a region map, wherein the region map includes the first type of region and a second type of region, the first type of region is a region not containing the target object, and the second type of region is a region containing a target object; and
   displaying an updated region map via the lens of the AR glasses.

3. The image display method according to claim 2, wherein after updating the region map, the method further comprises:
   calculating a job completion rate according to an area rate of the first type of region and the second type of region in the updated region map, and displaying the job completion rate via the lens of the AR glasses.

4. The image display method according to claim 1, further comprising:
   receiving a safety monitoring message transmitted by a safety device and displaying the safety monitoring message via the lens of the AR glasses, wherein the safety device comprises any one or a combination of some of the following devices: a safety belt detection device, a blood pressure monitoring device and a heart rate detection device.

5. The image display method according to claim 1, wherein after acquiring the target image collected by the second camera after adjusting the shooting angle, the method further comprises:
   performing an image recognition operation on the target image, and determining a regional terrain of a region corresponding to the target image according to an image recognition result; and
   if the regional terrain is dangerous, generating a corresponding prompt message.

6. The image display method according to claim 1, wherein acquiring the target image collected by the second camera after adjusting the shooting angle comprises:

acquiring a plurality of the target images collected by the second camera after adjusting the shooting angle;
correspondingly, the method further comprises:
determining a common shooting region of all the target images;
performing a similarity comparison operation on the common shooting region in adjacent target images according to a shooting sequence; and
judging whether there is a high-altitude falling object in the common shooting region according to a similarity comparison result; and
if yes, generating a corresponding alarm message.

7. The image display method according to claim 1, wherein the AR glasses further comprise an acceleration sensor for detecting a head tilt angle;
correspondingly, the image display method further comprises:
calculating a visible region of the glasses wearer according to the head tilt angle and the eye rotation information;
setting a region in the visible region where a viewing angle is less than a preset value as a region to be blocked;
determining a target lens region in the lens of the AR glasses through which a line of sight of the glasses wearer passes when the glasses wearer observes the region to be blocked; and
displaying a preset picture with a preset transparency in the target lens region.

8. AR glasses, characterized in comprising:
a first camera provided on an inner frame of the AR glasses and configured to take an eye picture of a glasses wearer;
a second camera provided on an outer frame of the AR glasses and configured to collect a target image; and
a processor connected with the first camera and the second camera respectively and configured to: determine eye rotation information of the glasses wearer according to the eye picture; adjust a shooting angle of the second camera according to the eye rotation information, and acquire a target image collected by the second camera after adjusting the shooting angle; judge whether there is a target object in the target image; and if yes, display an image including position information of the target object via a lens of the AR glasses.

9. The AR glasses according to claim 8, further comprising:
a communication device connected with the processor and the safety device respectively and configured to send a safety monitoring message transmitted by the safety device to the processor, wherein the safety device comprises any one or a combination of some of the following devices: a safety belt detection device, a blood pressure monitoring device and a heart rate detection device;
correspondingly, the processor is further configured to display the safety monitoring message via the lens of the AR glasses.

10. A non-transitory storage medium having computer executable instructions stored thereon, wherein when the computer executable instructions are loaded and executed by a processor, steps of the image display method are realized, wherein the method comprises:
detecting eye rotation information of a glasses wearer by using the first camera;
adjusting a shooting angle of the second camera according to the eye rotation information, and acquiring a target image collected by the second camera after adjusting the shooting angle;
judging whether there is a target object in the target image; and
if yes, displaying an image including position information of the target object via a lens of the AR glasses.

11. The non-transitory storage medium according to claim 10, wherein if there is no target object in the target image, the method further comprises:
setting a region corresponding to the target image as a first type of region, and updating a region map, wherein the region map includes the first type of region and a second type of region, the first type of region is a region not containing the target object, and the second type of region is a region containing a target object; and
displaying an updated region map via the lens of the AR glasses.

12. The non-transitory storage medium according to claim 11, wherein after updating the region map, the method further comprises:
calculating a job completion rate according to an area rate of the first type of region and the second type of region in the updated region map, and displaying the job completion rate via the lens of the AR glasses.

13. The non-transitory storage medium according to claim 10, wherein the method further comprises:
receiving a safety monitoring message transmitted by a safety device and displaying the safety monitoring message via the lens of the AR glasses, wherein the safety device comprises any one or a combination of some of the following devices: a safety belt detection device, a blood pressure monitoring device and a heart rate detection device.

14. The non-transitory storage medium according to claim 10, wherein after acquiring the target image collected by the second camera after adjusting the shooting angle, the method further comprises:
performing an image recognition operation on the target image, and determining a regional terrain of a region corresponding to the target image according to an image recognition result; and
if the regional terrain is dangerous, generating a corresponding prompt message.

15. The non-transitory storage medium according to claim 10, wherein acquiring the target image collected by the second camera after adjusting the shooting angle comprises:
acquiring a plurality of the target images collected by the second camera after adjusting the shooting angle;
correspondingly, the method further comprises:
determining a common shooting region of all the target images;
performing a similarity comparison operation on the common shooting region in adjacent target images according to a shooting sequence; and
judging whether there is a high-altitude falling object in the common shooting region according to a similarity comparison result; and
if yes, generating a corresponding alarm message.

16. The non-transitory storage medium according to claim 10, wherein the method further comprises:
calculating a visible region of the glasses wearer according to the head tilt angle and the eye rotation information;

setting a region in the visible region where a viewing angle is less than a preset value as a region to be blocked;

determining a target lens region in the lens of the AR glasses through which a line of sight of the glasses wearer passes when the glasses wearer observes the region to be blocked; and displaying a preset picture with a preset transparency in the target lens region.

\* \* \* \* \*